US006751588B1

(12) United States Patent
Menendez-Pidal et al.

(10) Patent No.: US 6,751,588 B1
(45) Date of Patent: Jun. 15, 2004

(54) METHOD FOR PERFORMING MICROPHONE CONVERSIONS IN A SPEECH RECOGNITION SYSTEM

(75) Inventors: Xavier Menendez-Pidal, Los Gatos, CA (US); Miyuki Tanaka, Tokyo (JP); Duanpei Wu, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/449,424

(22) Filed: Nov. 23, 1999

(51) Int. Cl.[7] ................. G10L 15/06; G10L 21/00
(52) U.S. Cl. ............... 704/233; 704/234; 704/226; 704/244
(58) Field of Search ................. 704/234, 243, 704/244, 226, 233

(56) References Cited

U.S. PATENT DOCUMENTS 5,528,731 A * 6/1996 Sachs et al. ............... 704/246
6,173,258 B1 * 1/2001 Menendez-Pidal et al. . 704/233
6,233,556 B1 * 5/2001 Teunen et al. ............. 704/250
6,327,565 B1 * 12/2001 Kuhn et al. ................ 704/255

OTHER PUBLICATIONS

Alexander D. Poularikas and Samuel Seely, Signals and Systems, PWS Engineering, Boston, p. 177, 306, and 475.*
John R. Deller, Jr., John G. Proakis, and John H. L. Hansen, Discrete–Time Processing of Speech Signals, Prentice–Hall, 1993, p. 360–361.*

Neumayer, Leonardo G.; Digalakis, Vassilios V.; Weintraub, Mitchell, "Training Issues and Channel Equalization Techniques for the Construction of Telephone Acoustic Models Using a High–Quality Speech Corpus," IEEE Transactions on Speech and Audio Processing, vol. 2, No. 4, Oct. 1994, pp. 590–597.

* cited by examiner

Primary Examiner—Susan McFadden
(74) Attorney, Agent, or Firm—Gregory J. Koerner; Simon & Koerner LLP

(57) ABSTRACT

A method for performing microphone conversions in a speech recognition system comprises a speech module that simultaneously captures an identical input signal using both an original microphone and a final microphone. The original microphone is also used to record an original training database. The final microphone is also used to capture input signals during normal use of the speech recognition system. A characterization module then analyzes the recorded identical input signal to generate characterization values that are subsequently utilized by a conversion module to convert the original training database into a final training database. A training program then uses the final training database to train a recognizer in the speech module in order to optimally perform a speech recognition process, in accordance with the present invention.

30 Claims, 8 Drawing Sheets

METHOD FOR PERFORMING MICROPHONE CONVERSIONS IN A SPEECH RECOGNITION SYSTEM

CROSS-REFERENCE TO RELATED APPLICATIONS

This application is related to U.S. Provisional Patent Application Serial No. 60/099,537, entitled "Front-End Techniques To Compensate Noise And Channel Distortion For Robust Speech Recognition," filed on Sep. 9, 1998, and to U.S. Pat. No. 6,173,258, entitled "Method For Reducing Noise Distortions In A Speech Recognition System," issued on Jan. 9, 2001. All of the foregoing related applications and patents are commonly assigned, and are hereby incorporated by reference.

BACKGROUND OF THE INVENTION

1. Field of the Invention

This invention relates generally to electronic speech recognition systems, and relates more particularly to a method for performing microphone conversions in a speech recognition system.

2. Description of the Background Art

Implementing an effective and efficient method for system users to interface with electronic devices is a significant consideration of system designers and manufacturers. Automatic speech recognition is one promising technique that allows a system user to effectively communicate with selected electronic devices, such as digital computer systems. Speech typically consists of one or more spoken utterances which each may include a single word or a series of closely-spaced words forming a phrase or a sentence.

An automatic speech recognizer typically builds a comparison database for performing speech recognition when a potential user "trains" the recognizer by providing a set of sample speech. Speech recognizers tend to significantly degrade in performance when a mismatch exists between training conditions and actual operating conditions. Such a mismatch may result from various types of acoustic distortion. One source that may create acoustic distortion is the presence of convolutive distortions due to the use of various different microphones during training process and the actual speech recognition process.

Referring now to FIG. 1(a), an exemplary waveform diagram for one embodiment of speech 112 recorded an original training microphone is shown. In addition, FIG. 1(b) depicts an exemplary waveform diagram for one embodiment of speech 114 recorded with a final microphone used in the actual speech recognition process. In practice, speech 112 of FIG. 1(a) and speech 114 of FIG. (1(b) typically exhibit mismatched characteristics, even when recording an identical utterance. This mismatch typically results in significantly degraded performance of a speech recognizer. In FIGS. 1(a) and 1(b), waveforms 112 and 114 are presented for purposes of illustration only. A speech recognition process may readily incorporate various other embodiments of speech waveforms.

From the foregoing discussion, it therefore becomes apparent that compensating for various different microphones a significant consideration of designers and manufacturers of contemporary speech recognition systems.

SUMMARY OF THE INVENTION

In accordance with the present invention, a method is disclosed for performing microphone conversions in a speech recognition system. In one embodiment of the present invention, initially, a speech module preferably captures the same input signal with an original microphone, and also simultaneously captures the same input signal with a final target microphone. In certain embodiments, the foregoing two recorded versions of the same input signal may be stored as speech data in a memory device.

The speech module preferably then accesses the recorded input signals using a feature extractor that separately processes the recorded input signals as recorded by the original microphone, and also as recorded by the final target microphone. A characterization module may preferably then perform a characterization process by analyzing the two versions of the same recorded input signal, and then responsively generating characterization values corresponding to the original microphone and the final microphone.

In certain embodiments, the characterization module may perform the foregoing characterization process by accessing the recorded input data as it is processed by the feature extractor in a frequency-energy domain following a fast Fourier transform procedure. In certain other embodiments, the characterization module may perform the foregoing characterization process further downstream by accessing the recorded input data as it is processed by the feature extractor in a cepstral domain following a frequency cosine transform process.

The speech module preferably then utilizes the feature extractor to process an original training database that was initially recorded using the original microphone. Next, a conversion module preferably may convert the original training database into a final training database by utilizing the characterization values that were previously generated by the characterization module.

A recognizer training program may then utilize the final training database to train a recognizer in the speech module. Finally, the speech module may advantageously utilize the trained recognizer in a speech recognition system that utilizes the final microphone to capture input data for optimized speech recognition, in accordance with the present invention. The present invention thus efficiently and effectively performs microphone conversions in a speech recognition system.

DETAILED DESCRIPTION OF THE PREFERRED EMBODIMENT

The present invention relates to an improvement in speech recognition systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention comprises a method for performing microphone conversions in a speech recognition system, and preferably includes a speech module that simultaneously captures an identical input signal using both an original microphone and a final microphone. The original microphone is also used to record an original training database. The final microphone is also used to capture input signals during normal use of the speech recognition system. A characterization module then analyzes the recorded identical input signal to generate characterization values that are subsequently utilized by a conversion module to convert the original training database into a final training database. A training program then uses the final training database to train a recognizer in the speech module in order to optimally perform a speech recognition process, in accordance with the present invention.

Figure 1:
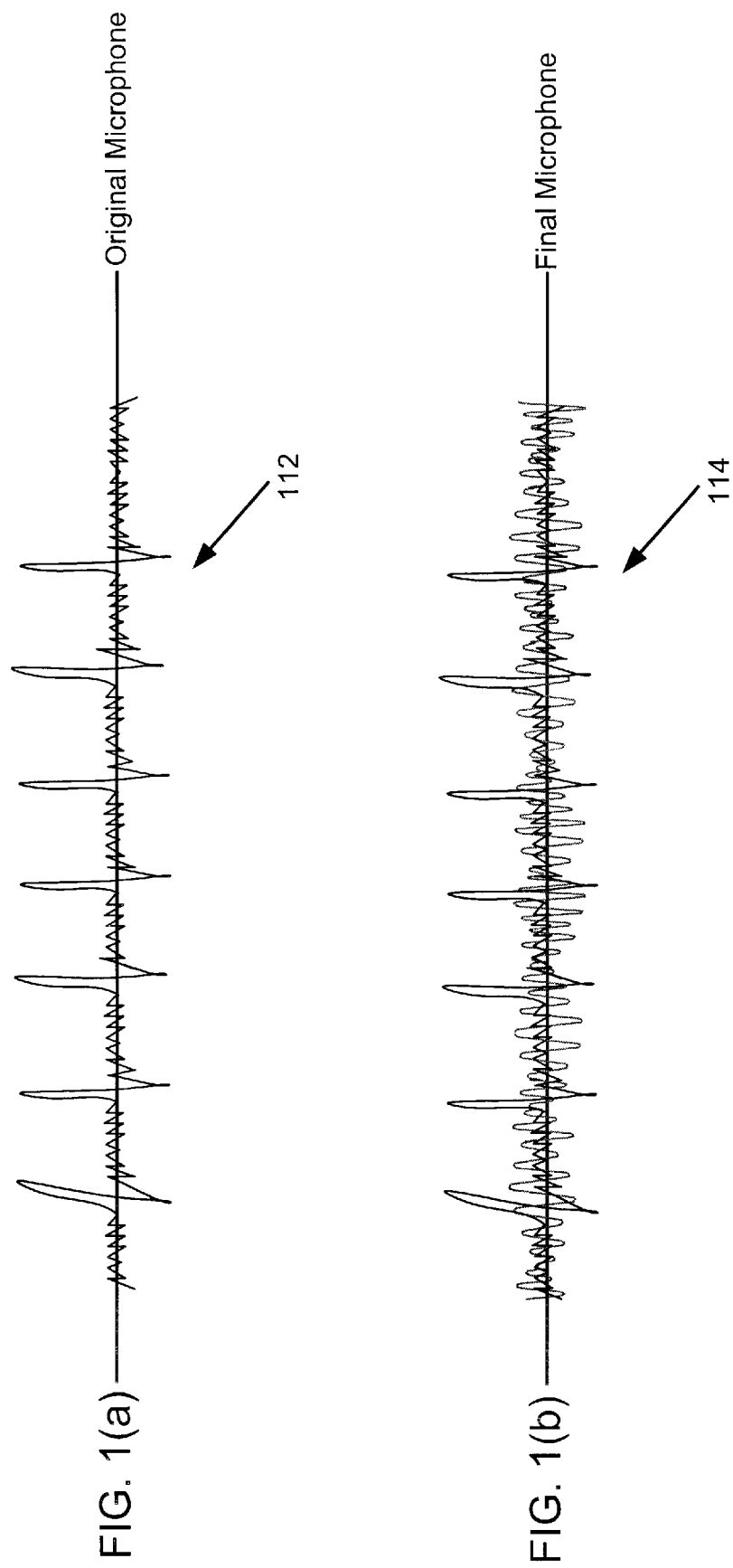
FIG. 1(a) is an exemplary waveform diagram for one embodiment of speech data from an original microphone.
FIG. 1(b) is an exemplary waveform diagram for one embodiment of speech data from a final microphone.
Figure 2:
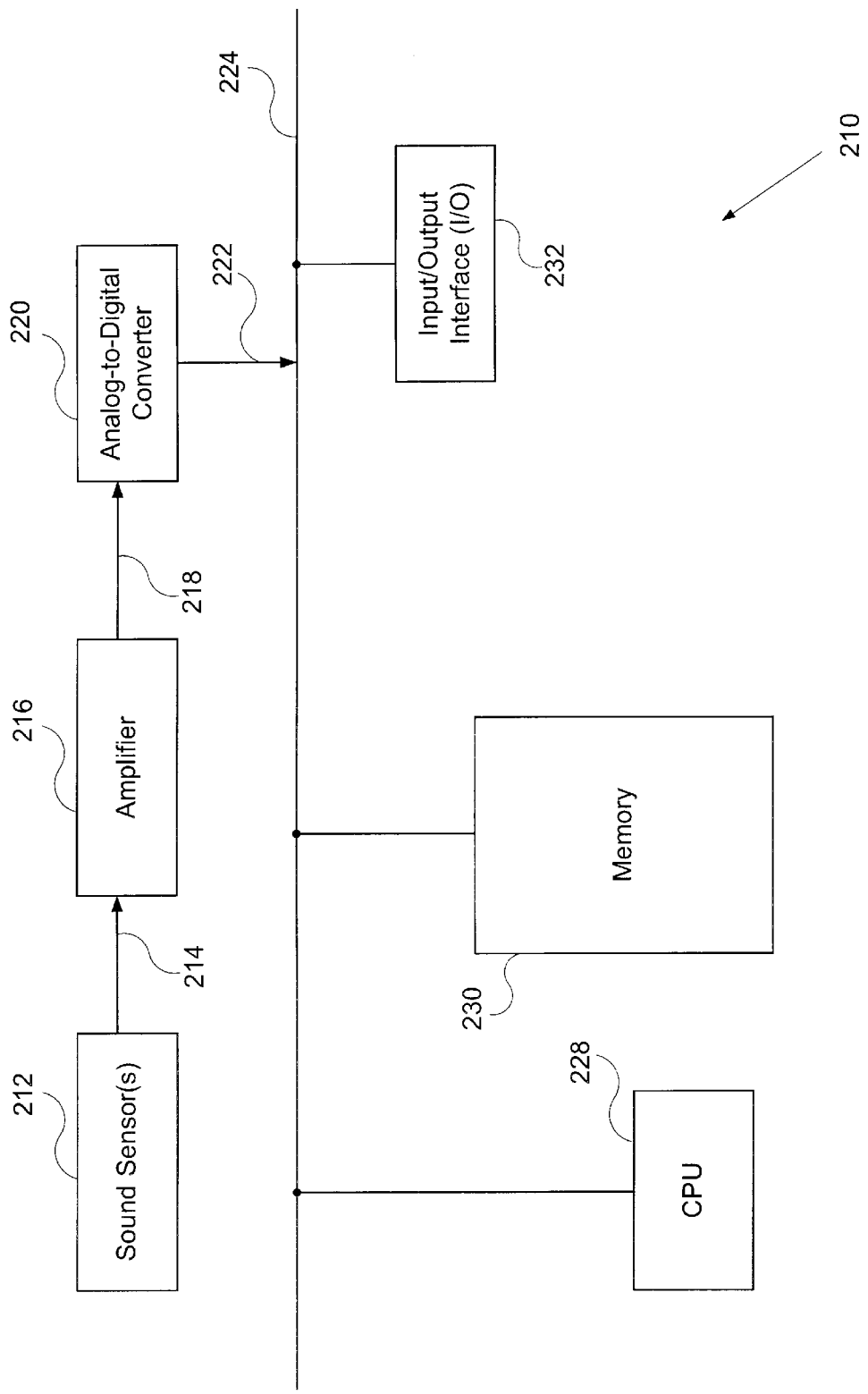
FIG. 2 is a block diagram of one embodiment for a computer system, in accordance with the present invention.

Referring now to FIG. 2, a block diagram of one embodiment for a computer system 210 is shown, in accordance with the present invention. The FIG. 2 embodiment includes a sound sensor 212, an amplifier 216, an analog-to-digital converter 220, a central processing unit (CPU) 228, a memory 230 and an input/output device 232.

In operation, sound sensor 212 may be implemented as a microphone that detects ambient sound energy and converts the detected sound energy into an analog speech signal which is provided to amplifier 216 via line 214. Amplifier 216 amplifies the received analog speech signal and provides an amplified analog speech signal to analog-to-digital converter 220 via line 218. Analog-to-digital converter 220 then converts the amplified analog speech signal into corresponding digital speech data and provides the digital speech data via line 222 to system bus 224.

CPU 228 may then access the digital speech data on system bus 224 and responsively analyze and process the digital speech data to perform speech recognition according to software instructions contained in memory 230. The operation of CPU 228 and the software instructions in memory 230 are further discussed below in conjunction with FIGS. 3–8. After the speech data is processed, CPU 228 may then advantageously provide the results of the speech recognition analysis to other devices (not shown) via input/output interface 232.

Figure 3:
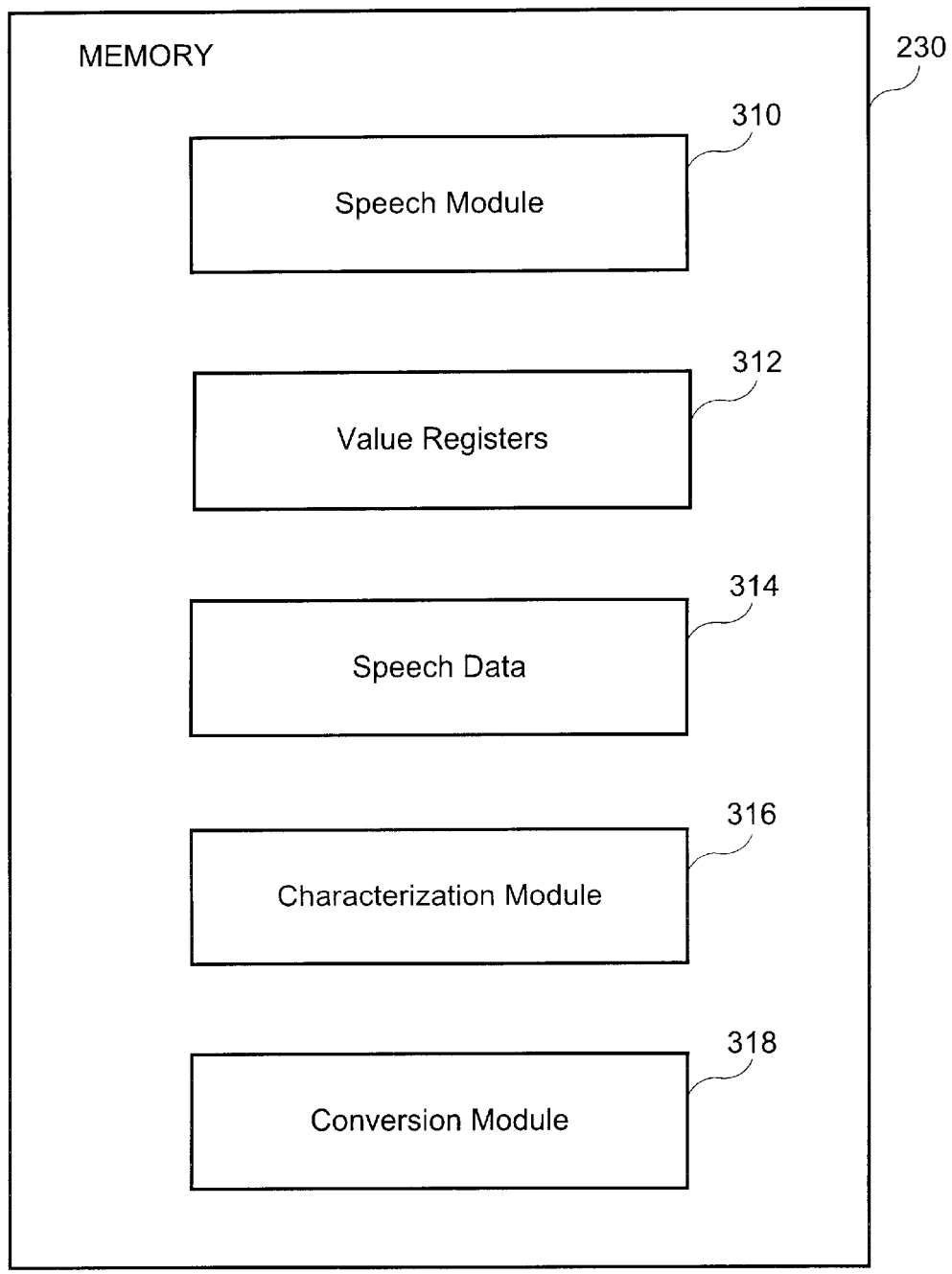
FIG. 3 is a block diagram of one embodiment for the memory of FIG. 2, in accordance with the present invention.

Referring now to FIG. 3, a block diagram of one embodiment for memory 230 of FIG. 2 is shown. Memory 230 may alternatively comprise various storage-device configurations, including Random-Access Memory (RAM) and non-volatile storage devices such as floppy-disks or hard disk-drives. In the FIG. 3 embodiment, memory 230 includes a speech module 310, value registers 312, speech data 314, a characterization module 316, and a conversion module 318.

In the preferred embodiment, speech module 310 includes a series of software modules which are executed by CPU 228 to analyze and recognizes speech data, and which are further described below in conjunction with FIGS. 4 through 8. In alternate embodiments, speech module 310 may readily be implemented using various other software and/or hardware configurations. Value registers 312, speech data 314, characterization module 316, and conversion module 318 are preferably utilized to efficiently perform a microphone conversion process, in accordance with the present invention. The utilization and functionality of value registers 312, speech data 314, characterization module 316, and conversion module 318 are further described below in conjunction with FIGS. 5 through 8.

Figure 4:
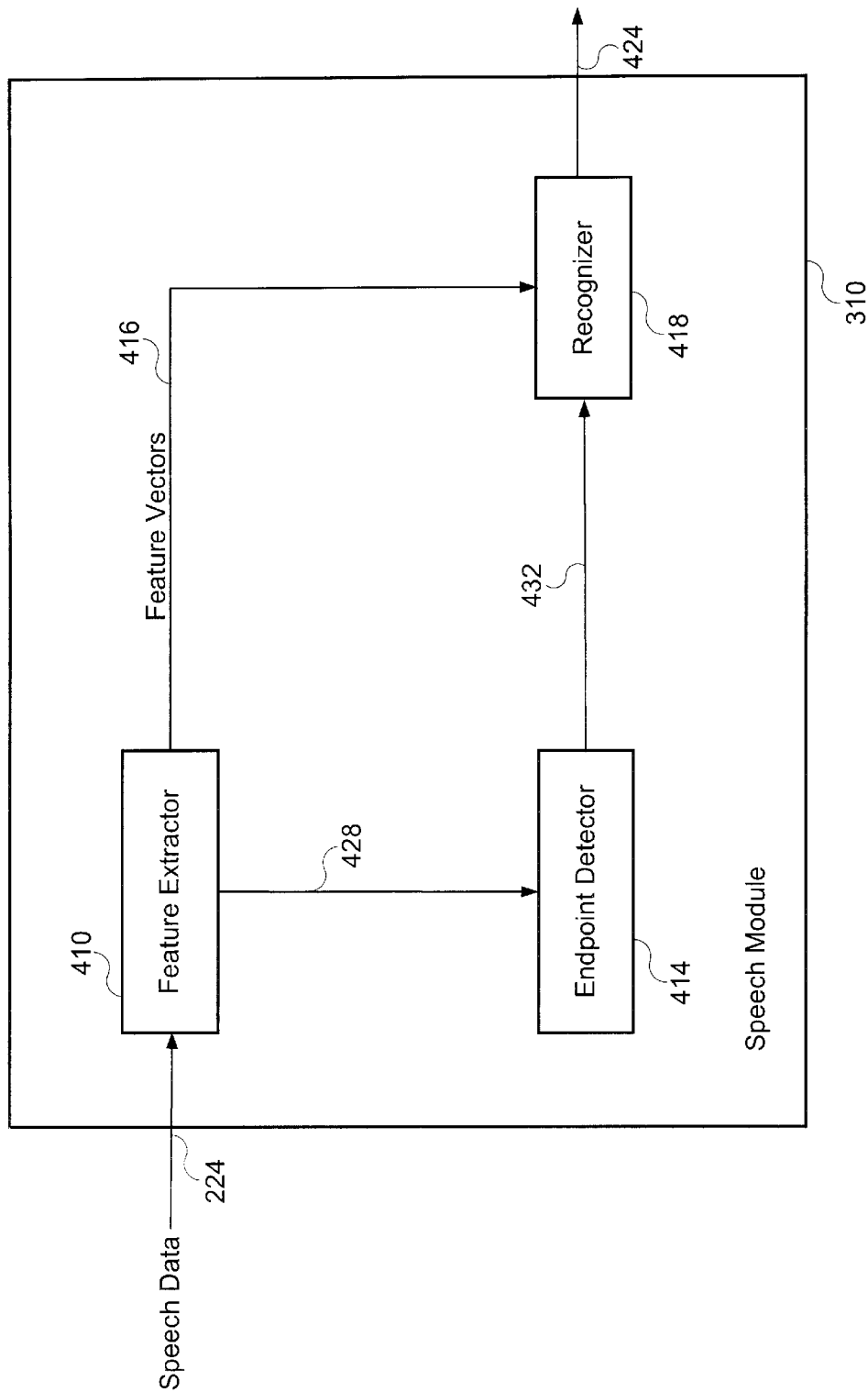
FIG. 4 is a block diagram of one embodiment for the speech module of FIG. 3.

Referring now to FIG. 4, a block diagram for one embodiment of the FIG. 3 speech module 310 is shown. In the FIG. 3 embodiment, speech module 310 includes a feature extractor 410, an endpoint detector 414, and a recognizer 418.

In operation, analog-to-digital converter 220 (FIG. 2) provides digital speech data to feature extractor 410 within speech module 310 via system bus 224. Feature extractor 410 responsively generates feature vectors which are then provided to recognizer 418 via path 416. Endpoint detector 414 analyzes speech energy received from feature extractor 410, and responsively determines endpoints (beginning and ending points) for the particular spoken utterance represented by the speech energy received via path 428. Endpoint detector 414 then provides the calculated endpoints to recognizer 418 via path 432. Recognizer 418 receives the feature vectors via path 416 and the endpoints via path 432, and responsively performs a speech recognition procedure to advantageously generate a speech recognition result to CPU 228 via path 424. In the FIG. 4 embodiment, recognizer 418 may effectively be implemented as a Hidden Markov Model (HMM) recognizer.

Figure 5:
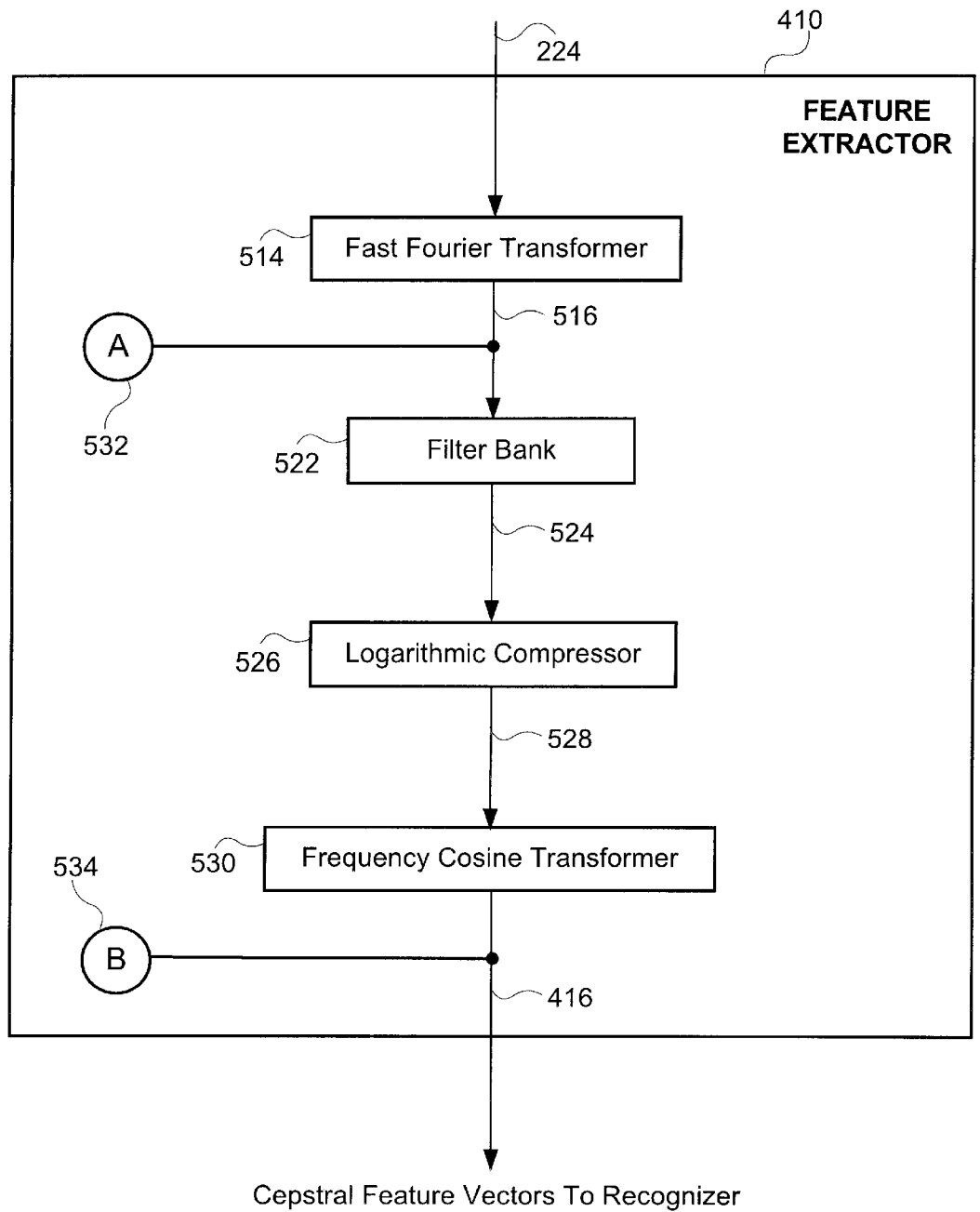
FIG. 5 is a block diagram of one embodiment for the feature extractor of FIG. 4, in accordance with the present invention.

Referring now to FIG. 5, a block diagram for one embodiment of the FIG. 4 feature extractor 410 is shown, in accordance with the present invention. In the FIG. 5 embodiment, feature extractor 410 includes a fast Fourier transformer 514, a filter bank 522, a logarithmic compressor 526, and a frequency cosine transformer 530. In alternate embodiments, feature extractor 410 may readily be implemented using various other appropriate configurations.

In operation, the FIG. 5 feature extractor 410 initially provides source speech data to fast Fourier transformer (FFT) 514 via path 224. FFT 514 responsively generates frequency-domain speech data by converting the source speech data from the time domain to the frequency-energy domain to facilitate subsequent noise compensation. Fast Fourier transforms are discussed in "Digital Signal Processing Principles, Algorithms and Applications," by John G. Proakis and Dimitris G. Manolakis, 1992, Macmillan Publishing Company, (in particular, pages 706–708) which is hereby incorporated by reference. FFT 514 then preferably provides the generated frequency-energy domain speech data to filter bank 522 via path 516. FFT 514 also may provide the frequency-domain speech data to a point A 532 for use in performing a microphone conversion process in accordance with the present invention.

In the FIG. 5 embodiment, filter bank 522 responsively filters the frequency-energy speech data into channel energy by dividing the frequency-energy speech data into a number of frequency sub-bands. Filter bank 522 then provides the filtered channel energy to logarithmic compressor 526 via path 524. Logarithmic compressor 526 then preferably converts the filtered channel energy received from filter bank 522 into logarithmic channel energy by separately calculating the logarithm of each frequency sub-band that comprises the filtered channel energy. Logarithmic compressor 526 then provides the logarithmic channel energy to frequency cosine transformer 530 via path 528.

In the FIG. 5 embodiment, frequency cosine transformer 530 performs a linear transformation process that decorrelates the logarithmic channel energy received from logarithmic compressor 526 to produce cepstral feature vectors. Adjacent channels of filter bank 522 may exhibit similar responses that result in disadvantageous correlations between sub-band energy values. Frequency cosine transform 530 preferably converts the channels (sub-bands) of received logarithmic channel energy into independent cepstral features that are compatible with an HMM recognizer such as the preferred embodiment of recognizer 418. The cepstral features preferably include a number of separate feature components.

The foregoing frequency cosine transform process and corresponding derivation of cepstral features are further discussed in the following references which are hereby incorporated by reference. "Speech Communication," by Douglas O'Shaughnessy, 1990, Addison-Wesley Publishing, (in particular, pages 422–423), and "Comparison Of Parametric Representations For Monosyllabic Word Recognition In Continuously Spoken Sentences," by S. B. Davis and Paul Mermelstein, 1980, IEEE.

Frequency cosine transformer 530 thus converts the received logarithmic channel energy into corresponding feature vectors in the cepstral domain which are preferably provided to recognizer 418 via path 416. Frequency cosine transformer 530 also may provide the cepstral-domain feature vectors to a point B 534 for use in performing a microphone conversion process in accordance with the present invention. The utilization of point A 532 and/or point B 534 during the performance of the foregoing microphone conversion process is further discussed below in conjunction with FIGS. 6 through 8.

Figure 6:
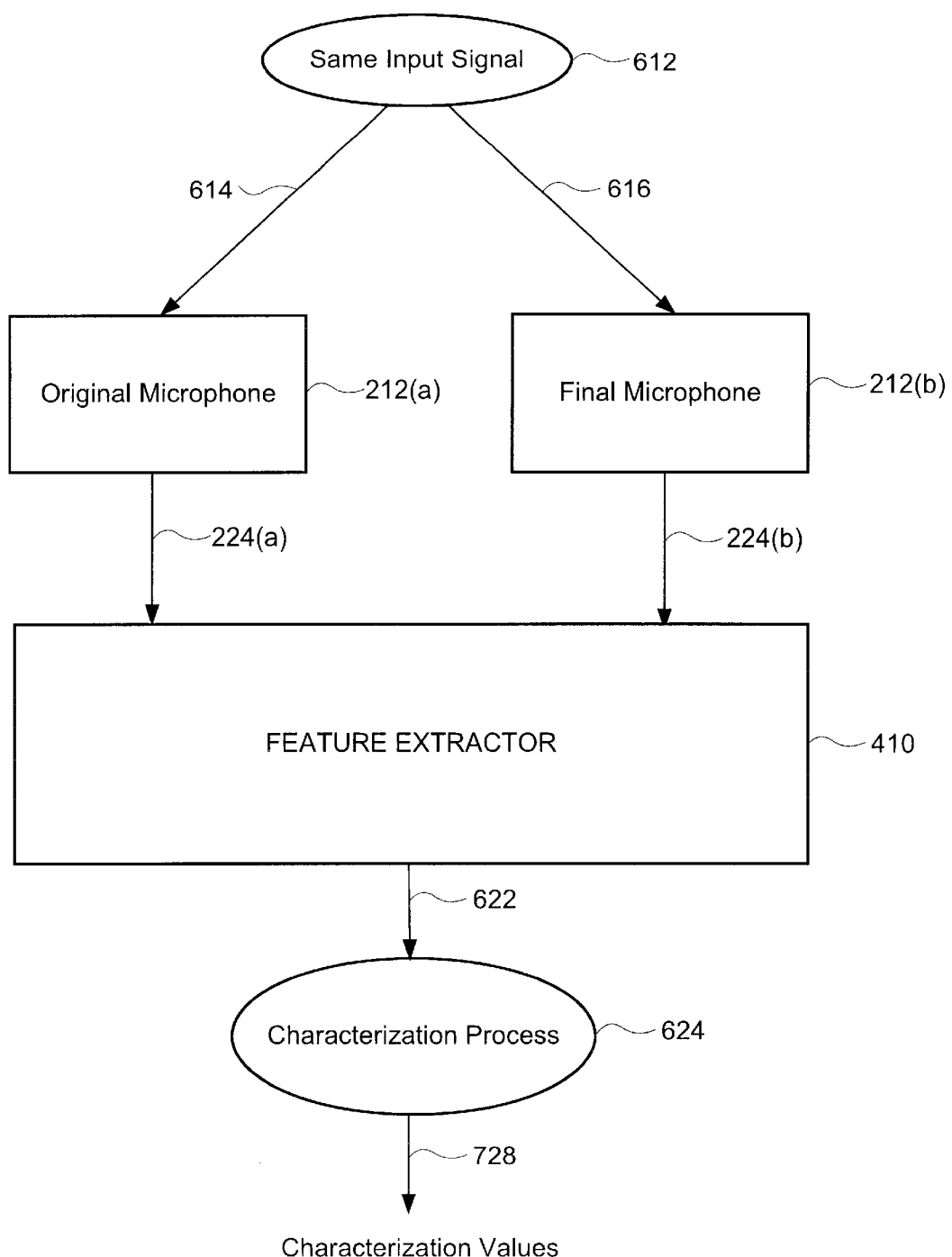
FIG. 6 is a diagram illustrating a microphone characterization process, in accordance with one embodiment of the present invention.

Referring now to FIG. 6, a diagram illustrating a microphone characterization process is shown, in accordance with one embodiment of the present invention. In alternate embodiments, the present invention may readily be implemented using various configurations and techniques other than those discussed in conjunction with the FIG. 6 embodiment.

Microphone compensation techniques utilized in speech recognition may be implemented in feature extractor 410 (or other acoustic front ends) because various input microphones or other signal transmission channels may introduce a constant component in the spectral domain. Microphones or transmission channels may introduce a convolutive noise which may be characterized by the impulse response of the particular microphone or channel.

In the time or frequency domain, a channel or microphone component may corrupt the input speech according to the following expression:

$$y[t]=h[t]*x[t]$$

where x[t] is the original clean speech signal, h[t] is the impulse response of the channel or microphone, and y[t] is the distorted speech as affected by the particular channel or microphone.

Linear microphone or channel distortions typically introduce a multiplicative constant in the frequency-energy domain. In contrast, linear microphone or channel distortions typically introduce an additive constant in the cepstral domain. For example, at point A (532) of FIG. 5, after applying FFT 514, the time domain input signal is preferably converted into the frequency-energy domain. In the frequency-energy domain, the distorted speech may be affected by a multiplicative constant according to the following formula:

$$Y_{k,n}=H_k*X_{k,n}$$

where $X_{k,n}$ is the energy at frame n and frequency k of the original input speech, $Y_{k,n}$ is the corrupted speech energy at frame n and frequency k, and $H_k$ is a constant, dependent on the frequency k, that is introduced by the particular microphone or channel that is used for recording the input speech.

In addition, at point B (534) of FIG. 5, after frequency cosine transformer 530 has completed its operation, the frequency-energy domain signal is preferably converted into the cepstral domain. In the cepstral domain, the distorted speech may be affected by an additive constant according to the following formula:

$$O_{c,n}=h_c+I_{c,n}$$

where $I_{c,n}$ is the cepstral feature at frame n of the original input speech, $O_{c,n}$ is the corrupted cepstral feature c at frame n, and $h_c$ is a constant, dependent on the cepstral feature c, that is introduced by the particular microphone or channel that is used for recording the input speech.

When the original microphone components ($H_{k,orig}$ or $h_{c,orig}$) that are used to train a recognizer are significantly different from the microphone components that are present in a final product ($H_{k,final}$ or $h_{c,final}$), then the accuracy of the speech recognition system may be substantially affected. The present invention therefore preferably converts the original training database that has been recorded with a high-quality microphone ($H_{k,orig}$ or $h_{c,orig}$) by utilizing the microphone characteristics ($H_{k,final}$ or $h_{c,final}$) from the microphone that is used in the final speech recognition product.

The purpose of the foregoing training database conversion process is to artificially develop a training corpus or database that includes the characteristics of the microphone used in the final speech recognition system. In other words, if the converted database is used to train recognizer 418, then recognizer 418 advantageously learns and operates with characteristics of the final target microphone instead of the characteristics of the original microphone used to initially record the training database.

In one embodiment, the present invention preferably initially forms characterizations of the original training microphone components ($H_{k,orig}$ or $h_{c,orig}$) and the final target microphone components ($H_{k,final}$ or $h_{c,final}$). The present invention then preferably substitutes the final target microphone components for the original training microphone components in the training database. Finally, recognizer 418 may be trained with the converted training database, and then may be advantageously utilized in a final speech recognition product (such as the FIG. 4 embodiment), in accordance with the present invention.

Estimation of the foregoing microphone components separately is a difficult problem unless the mathematical representation of the input signal is known. In accordance with the present invention, either the quotient of $H_{k,final}/H_{k,orig}$ (for the frequency domain), or the difference of $h_{c,final}-h_{c,orig}$ (for the cepstral domain) are utilized to convert the training database.

Referring again to the FIG. 6 embodiment, calculating either the foregoing quotient value or foregoing difference value is made simpler, and thus more efficient, by simultaneously recording the same identical input signal 612 using both original microphone 212(a) and final microphone 212(b) to thereby eliminate the necessity of deriving a mathematical knowledge of separate input signals.

In one embodiment, ten sentences of input speech may be recorded as the same input signal 612 to minimize the possibility of misalignment between sentences, and then preferably stored as two samples of speech data 314 in memory 230 (FIG. 3). In alternate embodiments, any appropriate amount of the same input signal 612 may be utilized, and other sound sources, such as noise, may likewise also be used in a similar fashion. However, in the preferred embodiment, the same input signal 612 comprises a broadband signal that is simultaneously received and separately captured using both original microphone 212(a) and final microphone 212(b).

In the FIG. 6 embodiment, after the same input signal 612 is captured by original microphone 212(a) and final microphone 212(b), then feature extractor 410 may separately process the two captured input signals as discussed above in conjunction with FIG. 5. In accordance with the present invention, characterization module 316 (FIG. 3) may perform a characterization process 624 to alternately characterize appropriate microphone components in the frequency domain at point A (532) of the FIG. 5 embodiment, or in the cepstral domain at point B (534) of the FIG. 5 embodiment.

In the frequency domain, characterization module 316 may estimate the quotient $H_{k,final}/H_{k,orig}$ by analyzing the captured input signal 612 to determine the average of the FFT 516 energy magnitudes at point A (532) according to the following formulas:

$$\frac{1}{N}\sum_{i=1}^{N} Y_{korig,i} = \frac{1}{N}\sum_{i=1}^{N} H_{k,orig} \cdot X_{k,i} = H_{k,orig} \cdot \frac{1}{N}\sum_{i=1}^{N} X_{k,i}$$

where N is the total number of frames existing in the captured input signal 612, and $1/N*\Sigma Y_{k,orig}$ is the average energy for the frequency k obtained over the captured input signal 612 with the original microphone 212(a), and $$\frac{1}{N}\sum_{i=1}^{N} Y_{kfinal,i} = \frac{1}{N}\sum_{i=1}^{N} H_{k,final} \cdot X_{k,i} = H_{k,final} \cdot \frac{1}{N}\sum_{i=1}^{N} X_{k,i}$$

where N is the total number of frames existing in the captured input signal 612, and $1/N*\Sigma Y_{k,final}$ is the average energy for the frequency k obtained over the captured input signal 612 with the final target microphone 212(b).

In accordance with one embodiment of the present invention, the quotient $H_{k,final}/H_{k,orig}$ may then be estimated by dividing the average energy of the captured input signal 612 obtained with the final target microphone 212(b) by the average energy obtained with the original microphone 212(a) according to the following formula:

$$\frac{\frac{1}{N}\sum_{i=1}^{N} Y_{kfinal,i}}{\frac{1}{N}\sum_{i=1}^{N} Y_{korig,i}} = \frac{H_{k,final} \cdot \frac{1}{N}\sum_{i=1}^{N} X_{k,i}}{H_{k,orig} \cdot \frac{1}{N}\sum_{i=1}^{N} X_{k,i}} = \frac{H_{k,final}}{H_{k,orig}}$$

Similarly, in the cepstral domain, characterization module 316 may estimate the difference $h_{c,final}-h_{c,orig}$ by analyzing the captured input signal 612 to determine the cepstral means at point B (534) according to the following formulas:

$$\frac{1}{N}\sum_{i}^{N} O_{corig,i} = \frac{1}{N}\sum_{i}^{N} (h_{c,orig} + I_{c,i}) = \frac{1}{N}\sum_{i}^{N} I_{c,i} + h_{c,orig}$$

where $1/N*\Sigma O_{c,orig}$ is the average of cepstral features obtained over the captured input signal 612 with the original microphone 212(a), and $$\frac{1}{N}\sum_{i}^{N} O_{cfinal,i} = \frac{1}{N}\sum_{i}^{N} (h_{c,final} + I_{c,i}) = \frac{1}{N}\sum_{i}^{N} I_{c,i} + h_{c,final}$$

where $1/N*\Sigma O_{c,final}$ is the average of cepstral features obtained over the captured input signal 612 with the final target microphone 212(b).

Since the same input signal 612 is used with both microphones, characterization module 316 may then estimate the cepstral difference $h_{c,final}-h_{c,orig}$ of the two microphones according to the following formula:

$$\frac{1}{N}\sum_{i}^{N} O_{cfinal,i} - \frac{1}{N}\sum_{i}^{N} O_{corig,i} = h_{c,final} - h_{c,orig}$$

Figure 7:
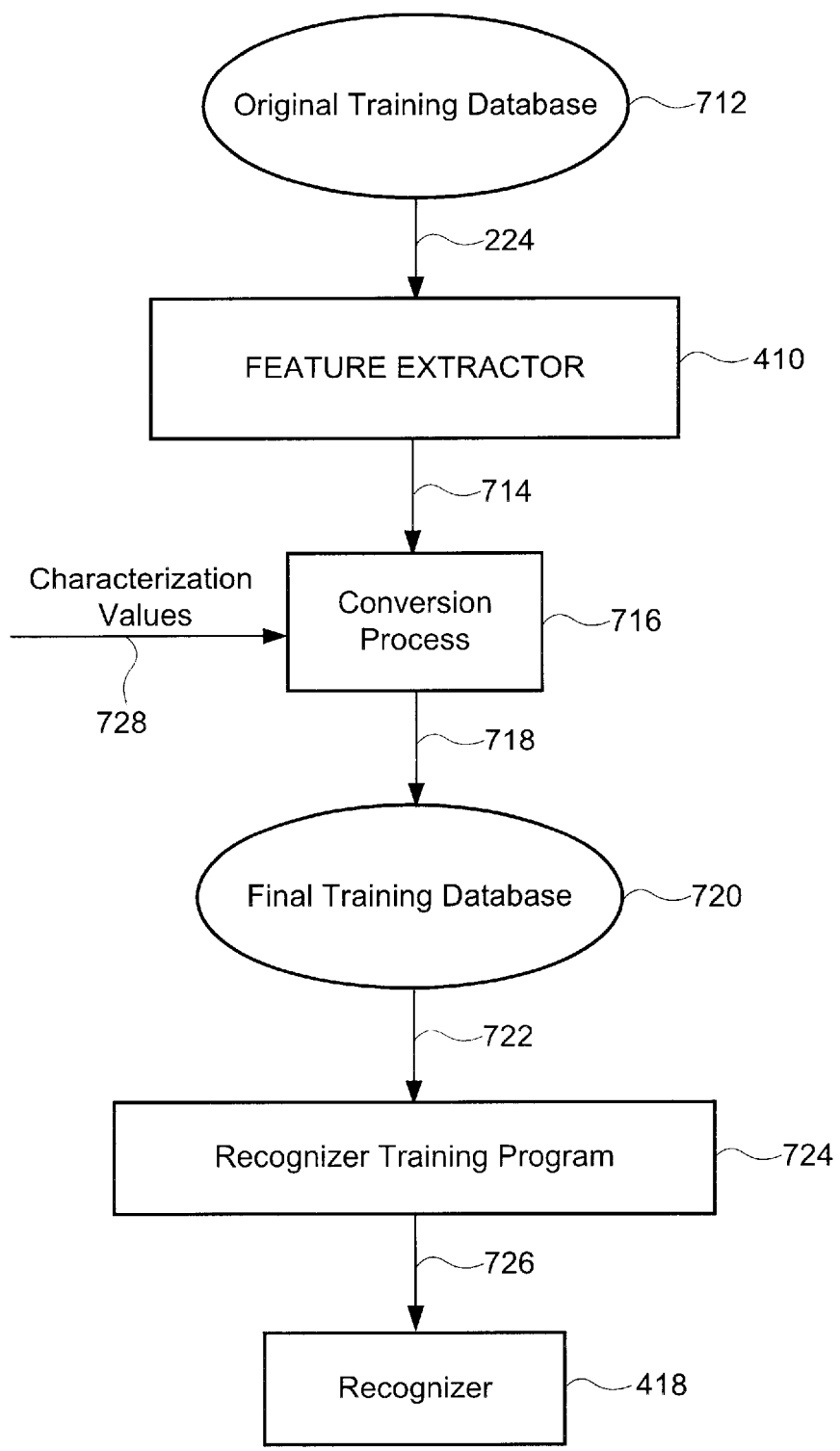
FIG. 7 is a diagram illustrating a training database conversion process, in accordance with one embodiment of the present invention.

In accordance with the present invention, the FIG. 6 embodiment may thus advantageously generate alternate sets of microphone characterization values to be used in conjunction with the FIG. 7 training database conversion process.

Referring now to FIG. 7, a diagram illustrating a training database conversion process is shown, in accordance with one embodiment of the present invention. In alternate embodiments, the present invention may readily be implemented using various configurations and techniques other than those discussed in conjunction with the FIG. 7 embodiment.

In the FIG. 7 embodiment, once characterization module 316 has performed the characterization process 624 of FIG. 6 to generate microphone estimates or characterization values ($H_{k,final}/H_{k,orig}$(for the frequency domain), or $h_{c,final}-h_{c,orig}$(for the cepstral domain), then conversion module 318 may advantageously utilize the generated microphone characterization values to convert the original training database 712 into a final training database 720 that matches the final target microphone characteristics.

Initially, in the FIG. 7 embodiment, original training database 712 may be provided to feature extractor 410 via path 224. Conversion module 318 may then access and perform a conversion process 716 upon the individual elements of original training database 712 in the frequency-energy domain at point A (532) of feature extractor 410, or, alternately, in the cepstral domain at point B (534) of feature extractor 410 (see FIG. 5). In the FIG. 7 embodiment, conversion module 318 preferably performs conversion process 716 to produce a final training database 720 by utilizing the characterization values that are initially generated during the FIG. 6 characterization process 624. In the FIG. 7 embodiment, conversion module 318 may then preferably access the characterization values by via path 728 to perform conversion process 716.

In the FIG. 7 embodiment, if conversion module 318 performs conversion process 716 in the frequency-energy domain at point A (532) of feature extractor 410, then conversion module 318 may preferably multiply the FFT energy values of original training database 712 by the constant $H_{k,final}/H_{k,orig}$ according to the following formula:

$$Y_{k,final,n} = Y_{korig,n}\left(\frac{H_{k,final}}{H_{k,orig}}\right) = H_{k,orig} \cdot X_{k,n} \cdot \left(\frac{H_{k,final}}{H_{k,orig}}\right) = H_{k,final} \cdot X_{k,n}$$

where $X_{k,n}$ is speech energy of the original training database 712 at frame n and frequency k, $Y_{k,n}$ is speech energy of the final training database 720 at frame n and frequency k, and $H_k$ is a constant that depends on the frequency k introduced by the original microphone 212(*a*) ($H_{k,orig}$), or by the final target microphone 212(*b*) ($H_{k,final}$).

Similarly, in the FIG. 7 embodiment, if conversion module 318 performs conversion process 716 in the cepstral domain at point B (534) of feature extractor 410, then conversion module 318 may preferably add the cepstral characterization value of $h_{c,final} - h_{c,orig}$ to all of the cepstral feature values from original training database 712 according to the following formula:

$$O_{cfinal,n} = h_{c,orig} + I_{c,n} + (h_{c,final} - h_{c,orig}) = h_{c,final} + I_{c,n}$$

where $I_{c,n}$ is the cepstral feature c of the original training database 712 at frame n, $O_{c,final}$ is cepstral feature c of the final training database 720 at frame n, and $h_c$ is a constant that depends on the cepstral feature c that was introduced by the original microphone 212(*a*) ($h_{c,orig}$), or by the final target microphone 212(*b*) ($h_{c,final}$).

The FIG. 7 embodiment thus produces a final training database 720 that may then be utilized by a recognizer training program 724 to advantageously train recognizer 418 with characteristics of final target microphone 212(*b*) already incorporated. Techniques for training a speech recognizer are further discussed in "Fundamentals Of Speech Recognition," by Lawrence Rabiner and Biing-Hwang Juan, 1993, Prentice-Hall, Inc., which is hereby incorporated by reference. Following the foregoing training process, speech module 310 may then effectively utilize the trained recognizer 418 as discussed above in conjunction with FIGS. 4 and 5 to optimally perform various speech recognition functions.

In certain alternate embodiments, recognizer 418 may directly analyze cepstral features from feature extractor 410 without performing the conversion process 716 (described above in conjunction with FIG. 7) to convert the original training database into a final training database. In such embodiments, in accordance with the present invention, a microphone conversion process may be performed directly within a recognizer 418 that has been trained with the original training database 712 created with original microphone 212(*a*) (the recognizer 418 has therefore preferably learned the constant $h_{c,orig}$). The recognizer 418 therefore may alternately perform a microphone conversion process by directly adding the shift value $h_{c\ final} - h_{c,orig}$ to all of the c cepstral components which then advantageously reflect the particular characteristics of the final target microphone 212(*b*).

Figure 8:
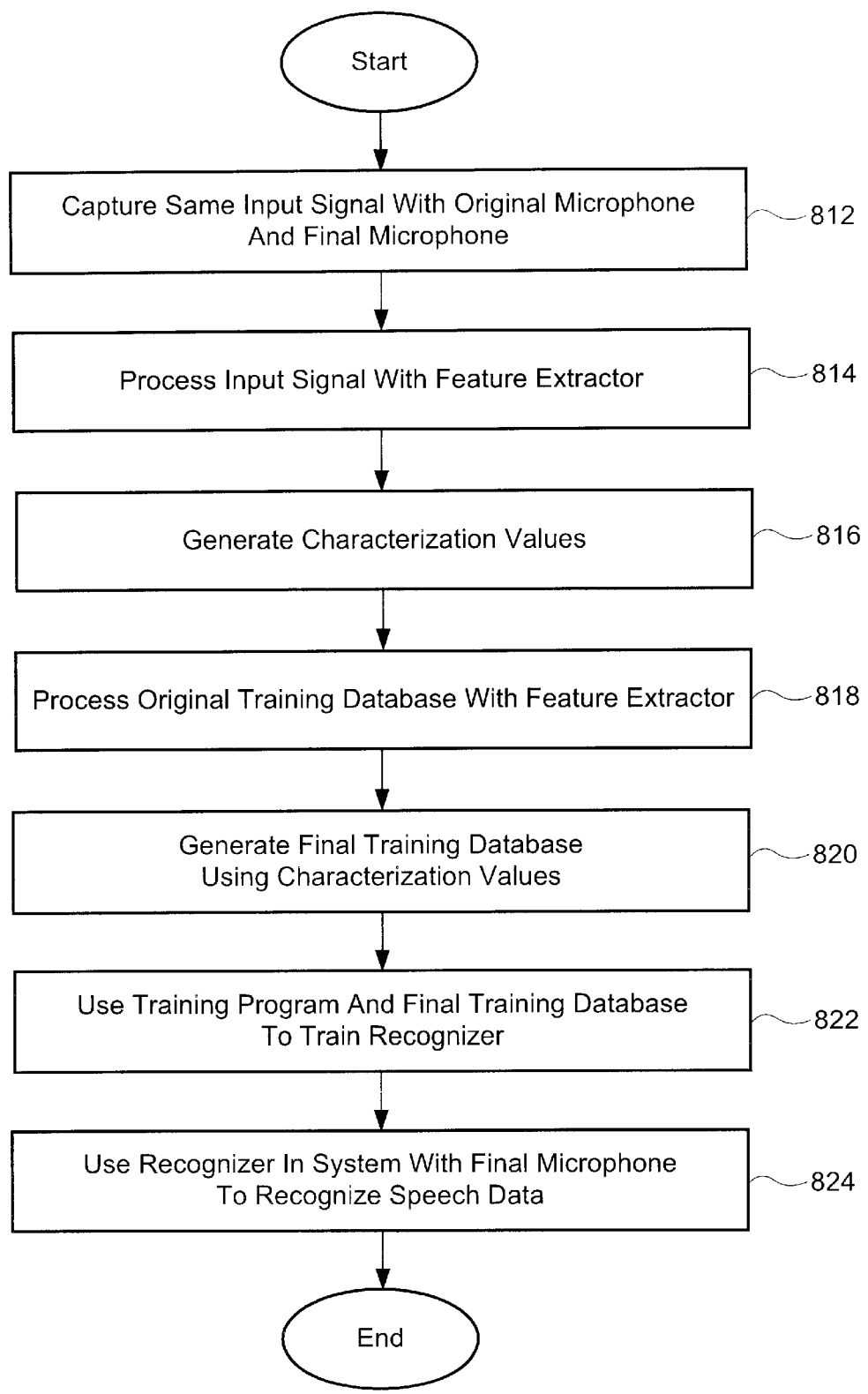
FIG. 8 is a flowchart of method steps for performing a microphone conversion process, in accordance with one embodiment of the present invention.

Referring now to FIG. 8, a flowchart of method steps for performing a microphone conversion process is shown, in accordance with one embodiment of the present invention. In the FIG. 8 embodiment, initially, in step 812, a speech module 310 preferably captures the same input signal 612 with an original microphone 212(*a*), and also simultaneously captures the same input signal 612 with a final target microphone 212(*b*). In certain embodiments, the foregoing two captured versions of the same input signal 612 may be stored as separate files of speech data 314 in memory 230.

In step 814, speech module 310 preferably accesses the two versions of the captured input signal 612 using a feature extractor 410 that separately processes the same input signal 612 as recorded by original microphone 212(*a*), and also as recorded by final target microphone 212(*b*). In response, in step 816, a characterization module 316 preferably performs a characterization process 624 by analyzing the two versions of the same input signal 612, and then generating characterization values corresponding to the original microphone 212(*a*) and the final microphone 212(*b*).

In one embodiment, characterization module 316 may perform the foregoing characterization process 624 by accessing input data from feature extractor 410 in the frequency-energy domain following a fast Fourier transformer 514. In another embodiment, characterization module 316 may perform the foregoing characterization process 624 further downstream by accessing input data from feature extractor 410 in the cepstral domain following a frequency cosine transformer 530. In certain other embodiments, characterization module 316 may utilize any suitable signals in to determine the characterization values.

In step 818, speech module 310 preferably utilizes feature extractor 410 to process an original training database 712 that was initially recorded using original microphone 212(*a*). Then, in step 820, a conversion module 318 preferably generates a final training database 720 using the characterization values that were generated by characterization module 316 in foregoing step 816.

In step 822, a recognizer training program 724 may utilize the final training database 720 to train a recognizer 418 in speech module 310. Finally, speech module 310 may advantageously utilize the trained recognizer 418 in a speech recognition system that includes final microphone 212(*b*), in order to recognize and identify various speech data, in accordance with the present invention.

The invention has been explained above with reference to a preferred embodiment. Other embodiments will be apparent to those skilled in the art in light of this disclosure. For example, the present invention may readily be implemented using configurations and techniques other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for performing a conversion process, comprising:

a characterization module configured to generate characterization values that represent a response difference between an original microphone and a final microphone, identical input signals being recorded by said original microphone to produce original data, said identical input signals being simultaneously recorded by said final microphone to produce final data, said original data and said final data being converted by a feature extractor into converted data in a frequency-energy domain, said characterization module examining said converted data to determine an average original energy magnitude according to the following formula:

$$\frac{1}{N}\sum_{i=1}^{N} Y_{korig,i} = \frac{1}{N}\sum_{i=1}^{N} H_{k,orig} \cdot X_{k,i} = H_{k,orig} \cdot \frac{1}{N}\sum_{i=1}^{N} X_{k,i}$$

where N is a total number of frames existing in said converted data, and $1/N * \Sigma Y_{k,orig}$ is an average energy for a frequency k obtained over said converted data from said original microphone;

a conversion module configured to utilize said characterization values for converting an original training database recorded with said original microphone into a final training database;

a speech module that is trained with said final training database, said speech module performing a speech recognition process on input signals that are recorded with said final microphone, said speech module including said feature extractor and a recognizer; and a processor for controlling said characterization module, said speech module, and said conversion module.

2. The system of claim 1 wherein said characterization module examines said converted data to determine an average final energy magnitude according to the following formula:

$$\frac{1}{N}\sum_{i=1}^{N} Y_{kfinal,i} = \frac{1}{N}\sum_{i=1}^{N} H_{k,final} \cdot X_{k,i} = H_{k,final} \cdot \frac{1}{N}\sum_{i=1}^{N} X_{k,i}$$

where N is a total number of frames existing in said converted data, and $1/N^* \Sigma Y_{k,final}$ is an average energy for a frequency k obtained over said converted data from said final microphone.

3. The system of claim 1 wherein said original training database is recorded with said original microphone, and wherein said recognizer is trained with said final training database to compensate for final characteristics of said final microphone that is used to record said input signals during said speech recognition process.

4. The system of claim 3 wherein said conversion process compensates for said response difference between said original microphone and said final microphone used during said speech recognition process.

5. The system of claim 1 wherein said feature extractor sequentially converts said input signals into converted signals in a frequency-energy domain, and into cepstral feature vectors in a cepstral domain.

6. The system according to claim 2 wherein said characterization values include a characterization quotient value $H_{k,final}/H_{k,orig}$ that may be estimated by dividing said average final energy magnitude by said average original energy magnitude according to the following formula:

$$\frac{\frac{1}{N}\sum_{i=1}^{N} Y_{kfinal,i}}{\frac{1}{N}\sum_{i=1}^{N} Y_{korig,i}} = \frac{H_{k,final} \cdot \frac{1}{N}\sum_{i=1}^{N} X_{k,i}}{H_{k,orig} \cdot \frac{1}{N}\sum_{i=1}^{N} X_{k,i}} = \frac{H_{k,final}}{H_{k,orig}}.$$

7. The system of claim 6 wherein said feature extractor converts said original training database into a converted database in said frequency-energy domain, and wherein said conversion module generates said final training database by multiplying said converted database by said characterization quotient value according to the following formula:

$$Y_{kfinal,n} = Y_{korig,n}\left(\frac{H_{k,final}}{H_{k,orig}}\right) = H_{k,orig} \cdot X_{k,n} \cdot \left(\frac{H_{k,final}}{H_{k,orig}}\right) = H_{k,final} \cdot X_{k,n}$$

where $X_{k,n}$ is speech energy of said original training database at a frame n and a frequency k, $Y_{k,n}$ is speech energy of said final training database at said frame n and said frequency k, and $H_k$ is a constant introduced by said original microphone or by said final microphone that depends on said frequency k.

8. The system of claim 1 wherein said original data and said final data are converted by said feature extractor into converted data in a secondary domain, said characterization module analyzing said converted data to generate said microphone characterization values, said conversion module utilizing said microphone characterization values to convert said original training database into said final training database.

9. The system of claim 8 wherein a recognizer training program utilizes said final training database to train said recognizer.

10. The system of claim 9 wherein said speech module utilizes said recognizer trained with said final training database to perform said speech recognition process after receiving said input signals from said final microphone.

11. A system for performing a conversion process, comprising:

a characterization module configured to generate characterization values that represent a response difference between an original microphone and a final microphone, identical input signals being recorded by said original microphone to produce original data, said identical input signals being simultaneously recorded by said final microphone to produce final data, said original data and said final data being converted by a feature extractor into converted data in a cepstral domain, said characterization module analyzing said converted data to determine original cepstral means according to the following formula:

$$\frac{1}{N}\sum_{i}^{N} O_{corig,i} = \frac{1}{N}\sum_{i}^{N} (h_{c,orig} + I_{c,i}) = \frac{1}{N}\sum_{i}^{N} I_{c,i} + h_{c,orig}$$

where N is a total number of frames existing in said converted data, and $1/N^* \Sigma O_{c,orig}$ is an average of cepstral features obtained over said converted data from said original microphones;

a conversion module configured to utilize said characterization values for converting an original training database recorded with said original microphone into a final training database;

a speech module that is trained with said final training database, said speech module performing a speech recognition process on input signals that are recorded with said final microphone, said speech module including said feature extractor and a recognizer; and a processor for controlling said characterization module, said speech module, and said conversion module.

12. The system of claim 11 wherein said characterization module examines said converted data to determine final cepstral means according to the following formula:

$$\frac{1}{N}\sum_{i}^{N} O_{cfinal,i} = \frac{1}{N}\sum_{i}^{N} (h_{c,final} + I_{c,i}) = \frac{1}{N}\sum_{i}^{N} I_{c,i} + h_{c,final}$$

where N is a total number of frames existing in said converted data, and $1/N^* \Sigma O_{c,final}$ is an average of cepstral features obtained over said converted data from said final microphone.

13. The system according to claim 12 wherein said characterization values include a characterization difference value $h_{c,final} - h_{c,orig}$ that may be estimated by subtracting said original cepstral means from said final cepstral means according to the following formula:

$$\frac{1}{N}\sum_{i}^{N} O_{cfinal,i} - \frac{1}{N}\sum_{i}^{N} O_{corig,i} = h_{c,final} - h_{c,orig}.$$

14. The system of claim 13 wherein said feature extractor converts said original training database into a converted database in said cepstral domain, and wherein said conversion module generates said final training database by adding said characterization difference value to said converted database according to the following formula:

$$O_{cfinal,n} = h_{c,orig} + I_{c,n} + (h_{c,final} - h_{c,orig}) = h_{c,final} + I_{c,n}$$

where $I_{c,n}$ is a cepstral feature c of said original training database at a frame n, $O_{c,final}$ is a cepstral feature c of said final training database at said frame n, and $h_c$ is a constant introduced by said original microphone or by said final microphone that depends on said cepstral feature c.

15. The system of claim 13 wherein said recognizer is trained with said original training database, said recognizer directly performing said microphone conversion process by adding said characterization difference value to cepstral components received from said feature extractor.

16. A method for performing a conversion process, comprising:
generating characterization values using a characterization module, said characterization values representing a response difference between an original microphone and a final microphone, identical input signals being recorded by said original microphone to produce original data, said identical input signals being simultaneously recorded by said final microphone to produce final data, said original data and said final data being converted by a feature extractor into converted data in a frequency-energy domain, said characterization module examining said converted data to determine an average original energy magnitude according to the following formula:

$$\frac{1}{N}\sum_{i=1}^{N} Y_{korig,i} = \frac{1}{N}\sum_{i=1}^{N} H_{k,orig} \cdot X_{k,i} = H_{k,orig} \cdot \frac{1}{N}\sum_{i=1}^{N} X_{k,i}$$

where N is a total number of frames existing in said converted data, and $1/N * \Sigma Y_{k,orig}$ is an average energy for a frequency k obtained over said converted data from said original microphones;
converting an original training database recorded with said original microphone into a final training database by using a conversion module that utilizes said characterization values;
performing a speech recognition process on input signals that are recorded with said final microphone by utilizing a speech module that is trained with said final training database, said speech module including said feature extractor and a recognizer; and
controlling said characterization module, said speech module, and said conversion module with a processor.

17. The method of claim 16 wherein said original training database is recorded with said original microphone, and wherein said recognizer is trained with said final training database to compensate for final characteristics of said final microphone that is used to record said input signals during said speech recognition process.

18. The method of claim 17 wherein said conversion process compensates for said response difference between said original microphone and said final microphone used during said speech recognition process.

19. The method of claim 16 wherein said feature extractor sequentially converts said input signals into converted signals in a frequency-energy domain, and into cepstral feature vectors in a cepstral domain.

20. The method of claim 16 wherein said characterization module examines said converted data to determine an average final energy magnitude according to the following formula:

$$\frac{1}{N}\sum_{i=1}^{N} Y_{kfinal,i} = \frac{1}{N}\sum_{i=1}^{N} H_{k,final} \cdot X_{k,i} = H_{k,final} \cdot \frac{1}{N}\sum_{i=1}^{N} X_{k,i}$$

where N is a total number of frames existing in said converted data, and $1/N * \Sigma Y_{k,final}$ is an average energy for a frequency k obtained over said converted data from said final microphone.

21. The method according to claim 20 wherein said characterization values include a characterization quotient value $H_{k,final}/H_{k,orig}$ that may be estimated by dividing said average final energy magnitude by said average original energy magnitude according to the following formula:

$$\frac{\frac{1}{N}\sum_{i=1}^{N} Y_{kfinal,i}}{\frac{1}{N}\sum_{i=1}^{N} Y_{korig,i}} = \frac{H_{k,final} \cdot \frac{1}{N}\sum_{i=1}^{N} X_{k,i}}{H_{k,orig} \cdot \frac{1}{N}\sum_{i=1}^{N} X_{k,i}} = \frac{H_{k,final}}{H_{k,orig}}.$$

22. The method of claim 21 wherein said feature extractor converts said original training database into a converted database in said frequency-energy domain, and wherein said conversion module generates said final training database by multiplying said converted database by said characterization quotient value according to the following formula:

$$Y_{kfinal,n} = Y_{korig,n}\left(\frac{H_{k,final}}{H_{k,orig}}\right) = H_{k,orig} \cdot X_{k,n} \cdot \left(\frac{H_{k,final}}{H_{k,orig}}\right) = H_{k,final} \cdot X_{k,n}$$

where $X_{k,n}$ is speech energy of said original training database at a frame n and a frequency k, $Y_{k,n}$ is speech energy of said final training database at said frame n and said frequency k, and $H_k$ is a constant introduced by said original microphone or by said final microphone that depends on said frequency k.

23. The method of claim 16 wherein said original data and said final data are converted by said feature extractor into converted data in a secondary domain, said characterization module analyzing said converted data to generate said microphone characterization values, said conversion module utilizing said microphone characterization values to convert said original training database into said final training database.

24. The method of claim 23 wherein a recognizer training program utilizes said final training database to train said recognizer.

25. The method of claim 24 wherein said speech module utilizes said recognizer trained with said final training database to perform said speech recognition process after receiving said input signals from said final microphone.

26. A method for performing a conversion process, comprising:

generating characterization values using a characterization module, said characterization values representing a response difference between an original microphone and a final microphone, identical input signals being recorded by said original microphone to produce original data, said identical input signals being simultaneously recorded by said final microphone to produce final data, said original data and said final data being converted by a feature extractor into converted data in a cepstral domain, said characterization module analyzing said converted data to determine original cepstral means according to the following formula:

$$\frac{1}{N}\sum_i^N O_{corig,i} = \frac{1}{N}\sum_i^N (h_{c,orig} + I_{c,i}) = \frac{1}{N}\sum_i^N I_{c,i} + h_{c,orig}$$

where N is a total number of frames existing in said converted data, and $1/N*\Sigma O_{c,orig}$ is an average of cepstral features obtained over said converted data from said original microphone;

converting an original training database recorded with said original microphone into a final training database by using a conversion module that utilizes said characterization values;

performing a speech recognition process on input signals that are recorded with said final microphone by utilizing a speech module that is trained with said final training database, said speech module including said feature extractor and a recognizer; and controlling said characterization module, said speech module, and said conversion module with a processor.

27. The method of claim 26 wherein said characterization module examines said converted data to determine final cepstral means according to the following formula:

$$\frac{1}{N}\sum_i^N O_{cfinal,i} = \frac{1}{N}\sum_i^N (h_{c,final} + I_{c,i}) = \frac{1}{N}\sum_i^N I_{c,i} + h_{c,final}$$

where N is a total number of frames existing in said converted data, and $1/N*\Sigma O_{c,final}$ is an average of cepstral features obtained over said converted data from said final microphone.

28. The method according to claim 27 wherein said characterization values include a characterization difference value $h_{c,final} - h_{c,orig}$ that may be estimated by subtracting said original cepstral means from said final cepstral means according to the following formula:

$$\frac{1}{N}\sum_i^N O_{cfinal,i} - \frac{1}{N}\sum_i^N O_{corig,i} = h_{c,final} - h_{c,orig}.$$

29. The method of claim 28 wherein said feature extractor converts said original training database into a converted database in said cepstral domain, and wherein said conversion module generates said final training database by adding said characterization difference value to said converted database according to the following formula:

$$O_{cfinal,n} = h_{c,orig} + I_{c,n} + (h_{c,final} - h_{c,orig}) = h_{c,final} + I_{c,n}$$

where $I_{c,n}$ is a cepstral feature c of said original training database at a frame n, $O_{c,final}$ is a cepstral feature c of said final training database at said frame n, and $h_c$ is a constant introduced by said original microphone or by said final microphone that depends on said cepstral feature c.

30. The method of claim 28 wherein said recognizer is trained with said original training database, said recognizer directly performing said microphone conversion process by adding said characterization difference value to cepstral components received from said feature extractor.

* * * * *